(12) United States Patent
Yuan et al.

(10) Patent No.: US 8,354,784 B2
(45) Date of Patent: Jan. 15, 2013

(54) SOLID-STATE LIGHT EMITTING DEVICES WITH PHOTOLUMINESCENCE WAVELENGTH CONVERSION

(75) Inventors: Xianglong Yuan, Fremont, CA (US); Bing Dai, Fremont, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 43 days.

(21) Appl. No.: 12/892,754

(22) Filed: Sep. 28, 2010

(65) Prior Publication Data

US 2012/0074833 A1  Mar. 29, 2012

(51) Int. Cl.
*H01J 1/62* (2006.01)

(52) U.S. Cl. ......... 313/483; 313/485; 313/486; 313/487

(58) Field of Classification Search ................... 313/483, 313/485, 486, 487, 489
See application file for complete search history.

(56) References Cited

U.S. PATENT DOCUMENTS

| | | | |
|---|---|---|---|
| 5,998,925 A | 12/1999 | Shimizu et al. | |
| 7,311,858 B2 | 12/2007 | Wang et al. | |
| 7,390,437 B2 | 6/2008 | Dong et al. | |
| 7,575,697 B2 | 8/2009 | Li et al. | |
| 7,601,276 B2 | 10/2009 | Li et al. | |
| 7,655,156 B2 | 2/2010 | Cheng et al. | |
| 2002/0167624 A1 | 11/2002 | Paolini et al. | |
| 2006/0158090 A1 | 7/2006 | Wang et al. | |
| 2007/0240346 A1 | 10/2007 | Li et al. | |
| 2008/0111472 A1 | 5/2008 | Liu et al. | |
| 2008/0218992 A1 | 9/2008 | Li | |
| 2008/0308825 A1 | 12/2008 | Chakraborty et al. | |
| 2009/0026908 A1 | 1/2009 | Bechtel et al. | |
| 2009/0103296 A1 | 4/2009 | Harbers et al. | |
| 2010/0308712 A1 | 12/2010 | Liu et al. | |

OTHER PUBLICATIONS

International Search Report and Written Opinion dated Feb. 1, 2012 for International Application No. PCT/US2011/052382, 10 pages.

*Primary Examiner* — Vip Patel
(74) *Attorney, Agent, or Firm* — Vista IP Law Group, LLP

(57) ABSTRACT

A light emitting device comprises at least one light emitter, typically an LED, operable to generate blue light and a wavelength conversion component. The wavelength conversion component can be light transmissive or light reflective and comprises at least two phosphor materials that are operable to absorb at least a portion of said blue light and emit light of different colors and wherein the emission product of the device comprises the combined light generated by the LED(s) and the phosphor materials. The phosphor materials are configured as a pattern of non-overlapping areas on a surface of the component.

35 Claims, 13 Drawing Sheets

SOLID-STATE LIGHT EMITTING DEVICES WITH PHOTOLUMINESCENCE WAVELENGTH CONVERSION

BACKGROUND OF THE INVENTION

1. Field of the Invention

This invention relates to solid-state light emitting devices with photoluminescence wavelength conversion and in particular, although not exclusively, white light emitting devices based on LEDs (Light Emitting Diodes) that are used to excite two or more phosphor materials that are located remote to the LED(s). The invention further concerns wavelength conversion components for converting the color (wavelength) of light generated by the solid-state light emitter.

2. Description of the Related Art

White light emitting LEDs ("white LEDs") are known in the art and are a relatively recent innovation. It was not until LEDs emitting in the blue/ultraviolet part of the electromagnetic spectrum were developed that it became practical to develop white light sources based on LEDs. As taught, for example in U.S. Pat. No. 5,998,925, white LEDs include one or more phosphor materials, that is photo-luminescent materials, which absorb a portion of the radiation emitted by the LED and re-emit radiation of a different color (wavelength). Typically, the LED chip or die generates blue light and the phosphor(s) absorbs a percentage of the blue light and re-emits yellow light or a combination of green and red light, green and yellow light, green and orange or yellow and red light. The portion of the blue light generated by the LED that is not absorbed by the phosphor combined with the light emitted by the phosphor provides light which appears to the human eye as being nearly white in color.

Due to their long operating life expectancy (>50,000 hours) and high luminous efficacy (70 lumens per watt and higher) high brightness white LEDs are increasingly being used to replace conventional fluorescent, compact fluorescent and incandescent light sources.

Typically a mixture of phosphor materials is provided as a single layer on the light emitting surface of the LED die. Alternatively the different phosphor materials can be provided as respective layers overlying the LED die.

As disclosed in United States patent application US 2008/02118992 A1 to Li, it is also known to provide the phosphor material as a layer on, or incorporate the phosphor material within an, optical component that is located remotely to the LED die.

It is an object of the present invention to provide a light emitting device that in part at least overcomes the limitations of the known devices.

SUMMARY OF THE INVENTION

Embodiments of the invention concern solid-state light emitting devices comprising one or more solid-state light emitters, typically LEDs, that is/are operable to generate blue light which is used to excite a photoluminescence wavelength conversion component that includes at least two blue light excitable phosphor materials. In accordance with the invention the phosphor materials are provided as a pattern of areas in which there is little or no overlap of areas of different phosphor materials. The inventors have discovered that in contrast to devices in which the different phosphor materials are provided as a mixture in a single layer or provided as overlaying separate layers, minimizing any overlap of the different phosphor materials can increase the quantum efficiency of the device and improve the CRI (Color Rendering Index) of light generated by such a device. It is believed that separating, that is not overlapping, the different phosphor materials reduces higher energy (shorter wavelength) light generated by one phosphor material being absorbed by the other phosphor material hereinafter referred to as "inter-phosphor absorption". Furthermore physically separating the different phosphor materials results in the color of the emission product being primarily determined by the relative areas and/or thickness of the phosphor material areas thereby enabling the color of the emission product to be tailored by changing the ratio of the phosphor material areas. In contrast to change the color of the emission product in devices that comprise a mixture of phosphor materials requires the formulation of a new mixture of phosphor materials.

According to the invention a light emitting device comprises at least one light emitter operable to generate blue light and a wavelength conversion component comprising at least two phosphor materials, wherein the phosphor materials are operable to absorb at least a portion of said blue light and emit light of different colors and wherein the emission product of the device comprises the combined light generated by the at least one light emitter and the phosphor materials and wherein the phosphor materials are provided as a pattern of substantially non-overlapping areas on a surface of the component. To prevent overlap of phosphor material areas, the phosphor material areas can be separated by a region, or gap, that does not contain phosphor material. The regions or gaps can be light transmissive, light reflective or light blocking. Where they are light transmissive the gaps act as windows allowing the emission of blue and phosphor generated light from the component. To prevent blue light generated by the light emitter overpowering the phosphor generated light, the regions or gaps separating phosphor areas are less than an about 0.5 mm (≈ten thousandths of an inch or 10 mil) and are typically of order 0.05 mm. In other arrangements phosphor material areas can be configured to abut each other or overlap slightly. In the context of this patent application overlapping slightly means that the total area of overlap of phosphor material areas is much less than the total area of non-overlapping phosphor material areas. To minimize inter-phosphor absorption, the area of overlap is preferably as small as possible and is typically less than 0.1% of the total area.

The pattern of phosphor material areas can comprise both regular and irregular patterns including for example a pattern of strips or lines of different phosphor materials; a pattern of pixels that can be circular, oval, square, rectangular, triangular, hexagonal or a tiling of geometric areas for example a tiling of rectangular or square areas. To ensure visual blending of the blue and phosphor generated light and to provide a uniform color emission product, the phosphor material areas preferably have at least one dimension that is less that about 2 mm. For example in one arrangement the pattern of phosphor materials comprises strips or lines of alternating phosphor materials of a width less than about 5 mm. In another arrangement the pattern of phosphor materials comprises a pattern of circular dots or pixels of the first phosphor material with the second phosphor material filling the area between the pixels. To generate different colors of light from different regions of the wavelength conversion component, the size and/or relative areas of the phosphor materials areas can be vary over the wavelength conversion component. It is envisioned that by configuring the pattern in such a way, this can be used to reduce angular variations in the color of the emission product of the device. For example for a white light emitting device it is envisaged to provide relatively more red emitting phosphor material than yellow emitting phosphor materials on regions, often the central region, of the wavelength conversion component where the incident blue light intensity is greatest. In one example the size of the red phosphor material areas can be larger towards the center of the component and reduce in size away from the central region To reduce the transfer of heat from the light emitter to the wavelength conversion component and thereby reduce thermal degradation of the phosphor materials, the wavelength conversion component is located advantageously located at a distance of at least 5 mm from the light emitter(s) and is preferably separated there from by an air gap.

The wavelength conversion component can be light transmissive and configured to convert the wavelength of at least a portion of the light transmitted through the component. In one arrangement the wavelength conversion component comprises a light transmissive substrate on a surface of which the pattern of phosphor materials are provided as at least one layer. Due to the isotropic nature of scattering of blue light by the phosphor materials and the isotropic nature of the photoluminescence process, a proportion of blue light and approximately half of phosphor generated light will be emitted from the wavelength conversion component back towards the light emitter. To maximize light emission from the device the back scattered blue light and phosphor converted light should be re-directed back to the wavelength conversion component for it to be transmitted through the component and to contribute to the emission product. Accordingly the device advantageously further comprise a light reflective chamber surrounding the light emitter and wavelength conversion component that is configured to re-direct backscattered light towards the wavelength conversion component. The light reflective chamber can comprise a light reflective metal surface or a light reflective polymer surface. The light reflective surface can comprise a mirror-like (non-diffusive) or a Lambertian-like (diffusive) reflective surface.

To further reduce inter-phosphor absorption the wavelength conversion component can be configured to prevent phosphor converted light generated in a direction back towards the light emitter by one phosphor material being re-directed by the light reflective chamber back through an area of the other phosphor material. For example in one arrangement the device comprises a wavelength selective reflective filter that is configured to be reflective to at least wavelengths of light generated by the two phosphor materials and is substantially transmissive to light generated by the at least one light emitter. In operation the wavelength reflective filter prevents the emission of phosphor converted light from the wavelength conversion component in a direction towards the light emitter thereby virtually eliminating inter-phosphor absorption since phosphor converted light will be reflected back into the phosphor material area that generated the light to begin with. In another arrangement the wavelength selective reflective filter comprises a respective reflective filter associated with each phosphor material area in which the reflective filter associated with the first phosphor material is configured to be reflective to at least wavelengths of light generated by the first phosphor material and is substantially transmissive to light generated by the at least one light emitter and in which the reflective filter associated with the second phosphor material is configured to be reflective to at least wavelengths of light generated by the second phosphor material and is substantially transmissive to light generated by the at least one light emitter. To minimize inter-phosphor absorption that can arise from the reflection of light within the light transmissive substrate, the wavelength selective filter is preferably located between the light transmissive substrate and phosphor material areas. For ease of fabrication the wavelength selective filter can be provided on a face of the light transmissive substrate and the pattern of phosphor material areas then deposited on the wavelength selective filter. The wavelength selective filter can comprise a multilayer structure comprising for example multiple layers of dielectric materials or a grating type structure.

In one arrangement the pattern of phosphor materials is provided on the substrate by screen printing. Alternatively the pattern of phosphor material can be applied to the substrate using other deposition techniques including inkjet, letterpress, gravure or flexograph printing. The light transmissive substrate can comprise a light transmissive polymer such as an acrylic, a polycarbonate, an epoxy or a silicone or a glass.

Alternatively the wavelength conversion component can be light reflective and configured to convert the wavelength of at least a portion of the light reflected by the component. One such wavelength conversion component comprises a light reflective surface on which the pattern of phosphor materials is provided as at least one layer. The pattern of phosphor materials can be provided on the light reflective substrate by for example printing, screen printing or inkjet printing. To maximize light emission the light reflective surface has as high a reflectance as possible and is preferably at least 0.9. The light reflective surface can comprise a light reflective metal such as for example silver, aluminum or chromium. Alternatively it can comprise a light reflective polymer, a light reflective paper or a light reflective paint.

Preferably the at least one light emitter comprises a solid-state light emitter such as an LED that is operable to generate blue light having a peak wavelength in a wavelength range 380 nm to 480 nm and typically about 440 nm to 450 nm.

According to another aspect of the invention a wavelength conversion component for a solid-state light emitting device for converting the wavelength of at least a portion of light generated by a light emitter comprises on a surface thereof a pattern of at least two phosphor materials configured as a pattern of substantially non-overlapping areas. To prevent overlap of neighboring phosphor material areas, neighboring phosphor material areas can be separated by a region, or gap, that does not contain phosphor material. Preferably the regions or gaps separating neighboring phosphor areas are less than an 0.5 mm ($\approx$0.01 inch) and can typically be or order 0.05 mm (0.001 inch or 10 mil). In alternative configurations neighboring phosphor material areas can abut each other.

To ensure a uniform color emission product, the phosphor material areas preferably have at least one dimension that is less that about 5 mm.

In one arrangement the wavelength conversion component is light transmissive and comprises a light transmissive substrate on which the pattern of phosphor materials are provided as at least one layer. To prevent the absorption by one phosphor material of light generated by the other phosphor material, the wavelength conversion component can further comprise a wavelength selective reflective filter that is configured to be reflective to at least wavelengths of light generated by the two phosphor materials and is substantially transmissive to wavelengths of light generated by the light emitter. In one arrangement the wavelength selective reflective filter comprises a respective reflective filter associated with each phosphor material in which the reflective filter associated with a first phosphor material is configured to be reflective to at least wavelengths of light generated by the first phosphor material and is substantially transmissive to wavelengths of light generated by the light emitter and in which the reflective filter associated with the second phosphor material is configured to be reflective to at least wavelengths of light generated by the second phosphor material and is substantially transmissive to wavelengths of light generated by the light emitter. To minimize inter-phosphor absorption the wavelength selective filter can be located between the light transmissive substrate and phosphor material areas. The wavelength selective filter can comprise a multilayer dielectric mirror or a grating type structure. The light transmissive substrate can comprise an acrylic, a polycarbonate, an epoxy, a silicone or a glass.

In alternative configurations the wavelength conversion component is light reflective and comprises a light reflective surface on which the pattern of phosphor materials are provided as at least one layer. Preferably the light reflective surface is highly reflective and has a reflectance of at least 0.9. The light reflective surface can comprise a reflective metal such as silver, aluminum or chromium, a light reflective polymer, a light reflective paper or a light reflective paint.

Conveniently the pattern of phosphor materials is provided on wavelength conversion component by printing, screen printing, inkjet printing or other deposition techniques.

The phosphor materials preferably comprise an inorganic material such as for example an orthosilicate, nitride, sulfate, oxy-nitride, oxy-sulfate or garnet (YAG) material has a particle size in a range 2 µm to 60 µm and more particularly 10 µm to 20 µm.

BRIEF DESCRIPTION OF THE DRAWINGS

In order that the present invention is better understood solid-state light emitting devices in accordance with embodiments of the invention will now be described, by way of example only, with reference to the accompanying drawings in which.

DETAILED DESCRIPTION OF THE INVENTION

Figure 1:
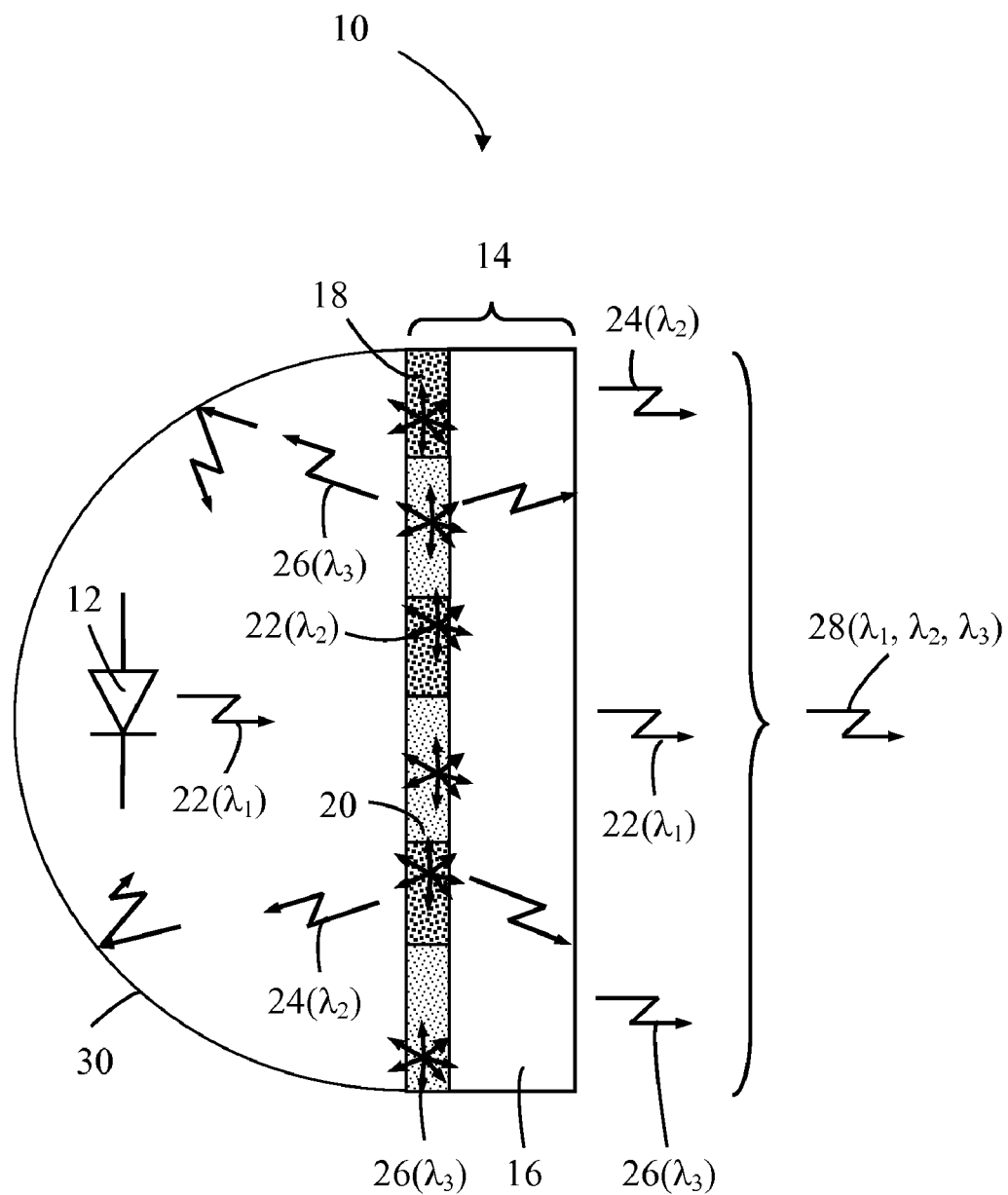
FIG. 1 is schematic representation of an LED-based light emitting device in accordance with an embodiment of the invention.

Embodiments of the invention are directed to light emitting devices comprising one or more solid-state light emitters, typically LEDs, which is/are operable to generate blue light which is used to excite a photoluminescence wavelength conversion component that includes at least two blue light excitable phosphor materials. The phosphor materials are preferably provided on the surface of the wavelength conversion component as a pattern of substantially non-overlapping regions which the inventors have found can give an improved quantum efficiency and CRI. It is believed that the improved quantum efficiency results from a reduction of light of a shorter wavelength (higher energy) generated by one phosphor material being absorbed by the other phosphor material. Throughout this specification like reference numerals are used to denote like parts.

FIG. 1 shows a schematic representation of an LED-based white light emitting device 10 in accordance with an embodiment of the invention. The device 10 comprises a blue light emitting LED 12 and a photoluminescence wavelength conversion component 14 located remotely to the LED. As shown the wavelength conversion component 14 can comprise a light transmissive substrate (window) 16 having on one face a pattern of at least two phosphor materials 18, 20. The light transmissive window 16 can comprise any light transmissive material such as a polymer material for example a polycarbonate, acrylic, silicone or epoxy or a glass such as a quartz glass. Typically the light transmissive window 16 is planar, often a circular disc, though it can be square, rectangular or other shapes depending on the intended application. When the light transmissive window 16 is disc-shaped the diameter can typically be between about 1 cm and about 15 cm that is an aperture of area 0.8 cm$^2$ and 180 cm$^2$. In alternative embodiments it is envisioned that the light transmissive window 16 comprise an optical component that directs light in a selected direction such as a convex, concave or Fresnel lens. To reduce the transfer of heat from the LED 12 to the wavelength conversion component 14, in particular heat transfer to the phosphor materials, the wavelength conversion component is preferably located remote to the LED, that is, physically separated by a distance of at least 5 mm. Typically the wavelength conversion component is separated from the LED by an air gap.

The blue LED 12 can comprise a GaN-based (gallium nitride-based) LED that is operable to generate blue light 22 having a peak wavelength $\lambda_1$ in a wavelength range 380 nm to 480 nm (typically 440 nm to 450 nm). The blue LED 12 is configured to irradiate the wavelength conversion component 14 with blue light 22 whereat a proportion is absorbed by the phosphor materials 18, 20 which in response emit light 24, 26 of a different respective wavelength $\lambda_2$, $\lambda_3$, typically red and yellow light for a warm white light emitting device. The emission product 28 of the device 10 which is configured to appear white in color comprises the combined light 22 emitted by the LED and the light 24, 26 generated by each of the phosphor materials 18, 20.

As indicated in FIG. 1 the device can further a light reflective chamber 30 surrounding the LED 12 and wavelength conversion component 14 to re-direct backscattered light towards the wavelength conversion component 14. The light reflective chamber is configured to direct light 22 generated by the LED 12 that is backscattered by the wavelength conversion component 14 and phosphor generated (photoluminescence) light 26, 28 generated by the phosphor materials.

Figure 2:
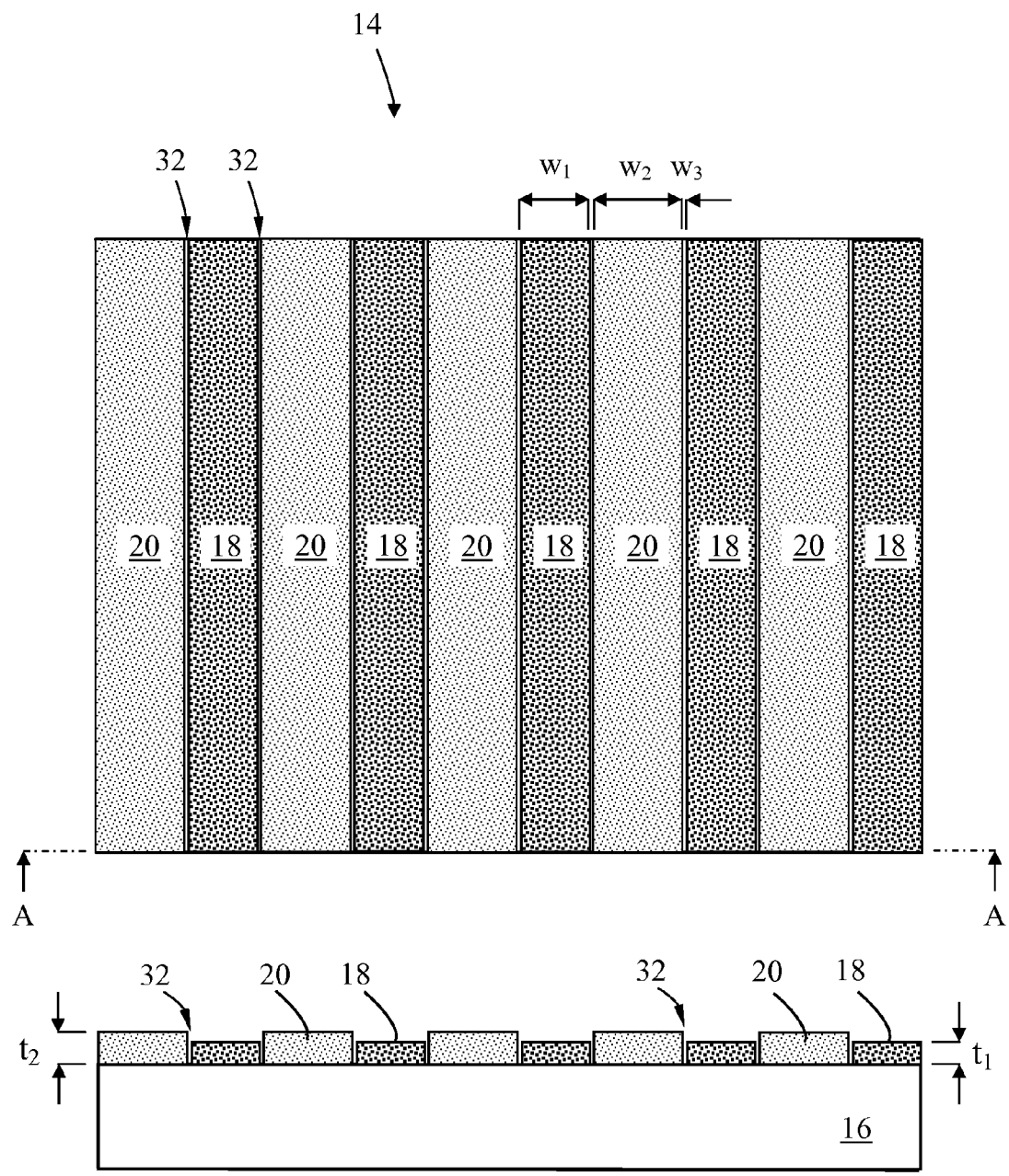
FIG. 2 are schematic plan and side views of a photoluminescence wavelength conversion component for use in the light emitting device of FIG. 1.

FIG. 2 shows schematic plan and side views of a photoluminescence wavelength conversion component 14 in accordance with an embodiment of the invention. In this exemplary embodiment the phosphor materials 18, 20 are configured as a pattern of areas comprising a series of parallel non-overlapping alternating strips or lines of width $w_1$ and $w_2$ respectively. Each phosphor material strip comprises a uniform thickness layer of phosphor material of a respective thickness $t_1$, $t_2$. It will be appreciated that the thickness of the phosphor material will determine the color of the light generated by the phosphor area. Typically phosphor material areas 20 comprising green or yellow light emitting materials have a thickness $t_2$ than is greater than phosphor material areas 18 comprising red light emitting phosphor materials of thickness $t_1$. In an exemplary embodiment $t_2$ is approximately one and a half times $t_1$. As shown the strips of different phosphor materials can be separated a narrow gap 30 of width $w_3$. As will be further described the gaps 30 prevent overlapping of the phosphor areas occurring during printing. The gaps 30 also allow the transmission of a proportion of the LED generated light 22. As indicated in FIG. 2 the gaps 30 between different phosphor material areas can comprise a physical space though in other embodiments the gap can comprise a region such as a light transmissive medium that does not contain any phosphor material.

An example of a wavelength conversion component 14 for generating warm white (CCT≈3000K) comprises a 2.5 inch (64 mm) diameter circular light transmissive disc with a pattern of alternating strips of a red light ($\lambda_2$ peak wavelength≈630 nm) emitting nitride phosphor material 18 and yellow light ($\lambda_3$ peak wavelength≈550 nm) emitting YAG material 20. Typically the phosphor material areas have a thickness $t_1 \approx 60$ μm and $t_2 \approx 100$ μm. The weight loading of phosphor material to light transmissive binder (Star Technology U.V. cure acrylic adhesive UVA4103) is approximately 1.2:1 and 2.8:1 for the red nitride and yellow YAG phosphor materials respectively. To generate warm white light the pattern is configured such that the red and yellow phosphor materials respectively cover ≈44% and ≈56% of the surface area (aperture) of the wavelength conversion component. To ensure visual blending of the blue 22 and phosphor generated light 24, 26 and to provide a uniform color emission product 28, the strips are as narrow as possible and typically have a width that is less that about 2 mm. For example in one embodiment the pattern of phosphor material strips are of dimensions $w_1=43.5$ mil (1.11 mm), $w_2=55.5$ mil (1.42 mm) and $w_3=0.5$ mil (0.01 mm).

It is further envisioned in alternative embodiments that the phosphor areas (strips) can be configured to abut each other.

Figure 3:
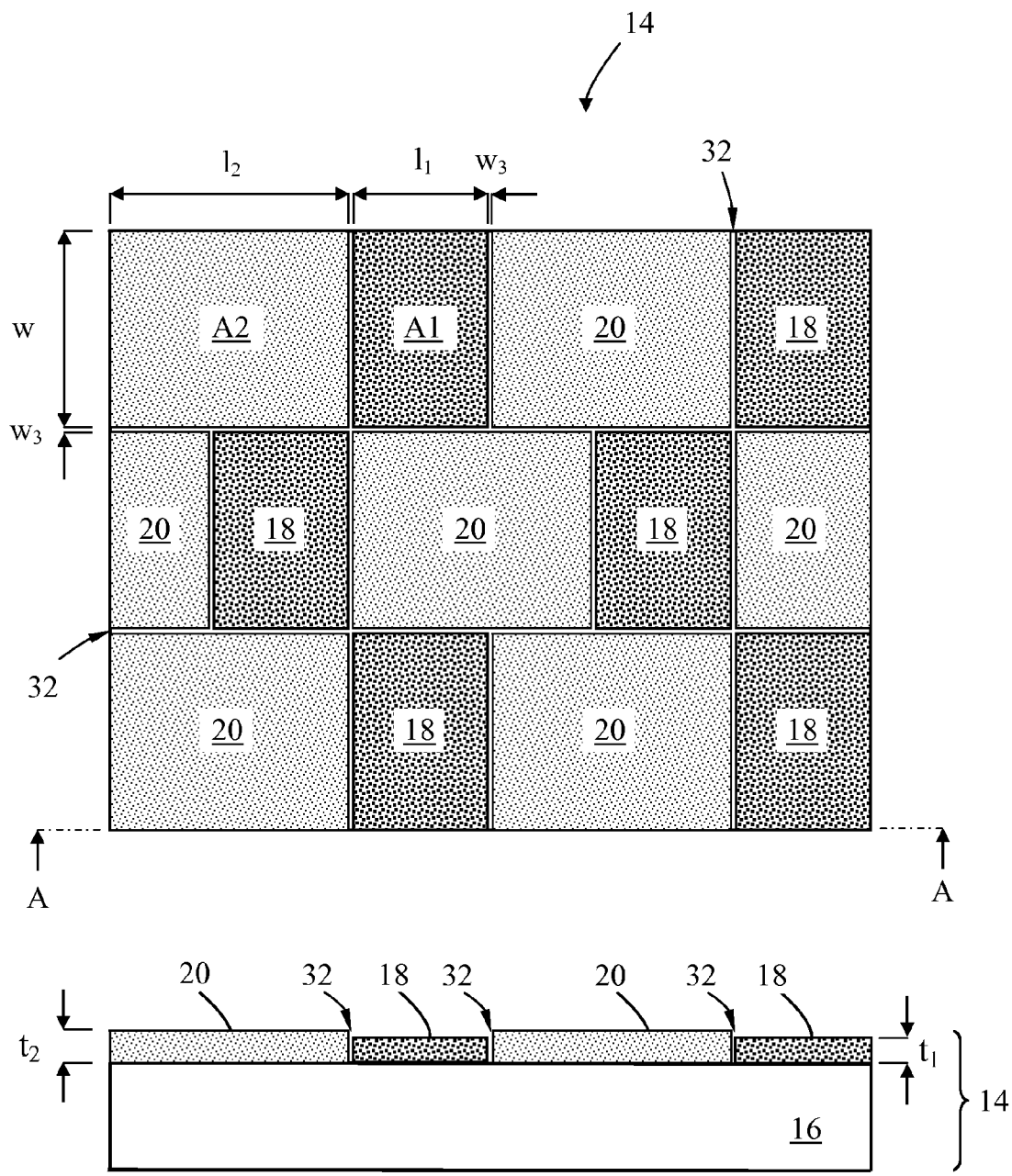
FIG. 3 are schematic plan and side views of another photoluminescence wavelength conversion component for use in the light emitting device of FIG. 1.

FIG. 3 shows schematic plan and side views of a wavelength conversion component 14 in accordance with another embodiment of the invention. In this exemplary embodiment the phosphor materials 18, 20 are configured as a pattern comprising an array of rectangular areas of width w and length $l_1$, $l_2$ respectively. As shown the rectangular areas can be separated by a narrow gap 30 of width $w_3$. It will be appreciated that the color of the emission product 28 generated by such a component 14 can be selected by the ratio of the areas $A_1$, $A_2$ of the different phosphor material areas that is $A_1:A_2$ ($l_1 \cdot w : l_2 \cdot w$). Moreover as described earlier the color of light generated by the each phosphor material area will also depend on the thickness $t_1$, $t_2$ of the areas. To ensure a uniform color emission product 28 the phosphor material areas typically have at least one dimension that is less that about 2 mm (w<2 mm and/or (($l_1$, $l_2$)<2 mm).

Figure 4:
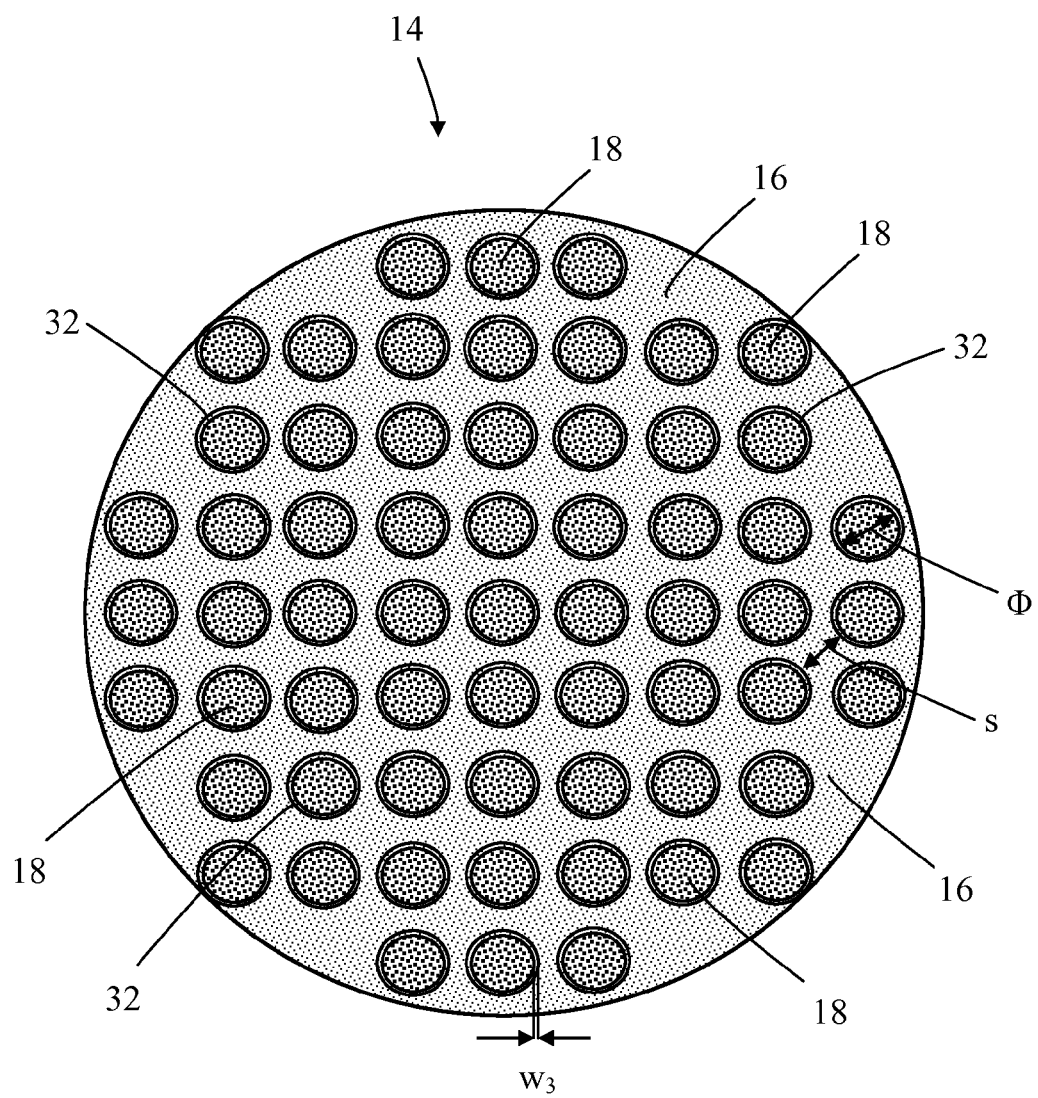
FIG. 4 is a schematic plan view of a further photoluminescence wavelength conversion component for use in the light emitting device of FIG. 1

FIG. 4 is schematic plan view of a wavelength conversion component 14 in accordance with a further embodiment of the invention. In this exemplary embodiment the pattern of phosphor materials is configured as a square array of circular areas, or dots, of the first phosphor material 18 with the second phosphor material 20 filling between circular areas. As shown a narrow gap 30 of width $w_3$ can be provided between each of the circular phosphor areas 18 and the surrounding phosphor material. Again to ensure a uniform color emission product 28 the circular phosphor material areas 18 typically have a diameter Φ that is less that about 2 mm and a maximum separation s between circular areas that is less that about 2 mm. In one arrangement the phosphor material dots 18 have a diameter Φ=75 mil (≈1.9 mm) and are configured such that the area proportion red phosphor material 18 and yellow phosphor material 20 are ≈44% and ≈56%.

It will be appreciated that the various patterns of phosphor materials described are exemplary only and that other patterns are within the scope of the invention. For example the pattern of phosphor materials can comprise regular or irregular patterns of circular, oval, square, triangular, diamond or hexagonal phosphor areas.

Figure 5:
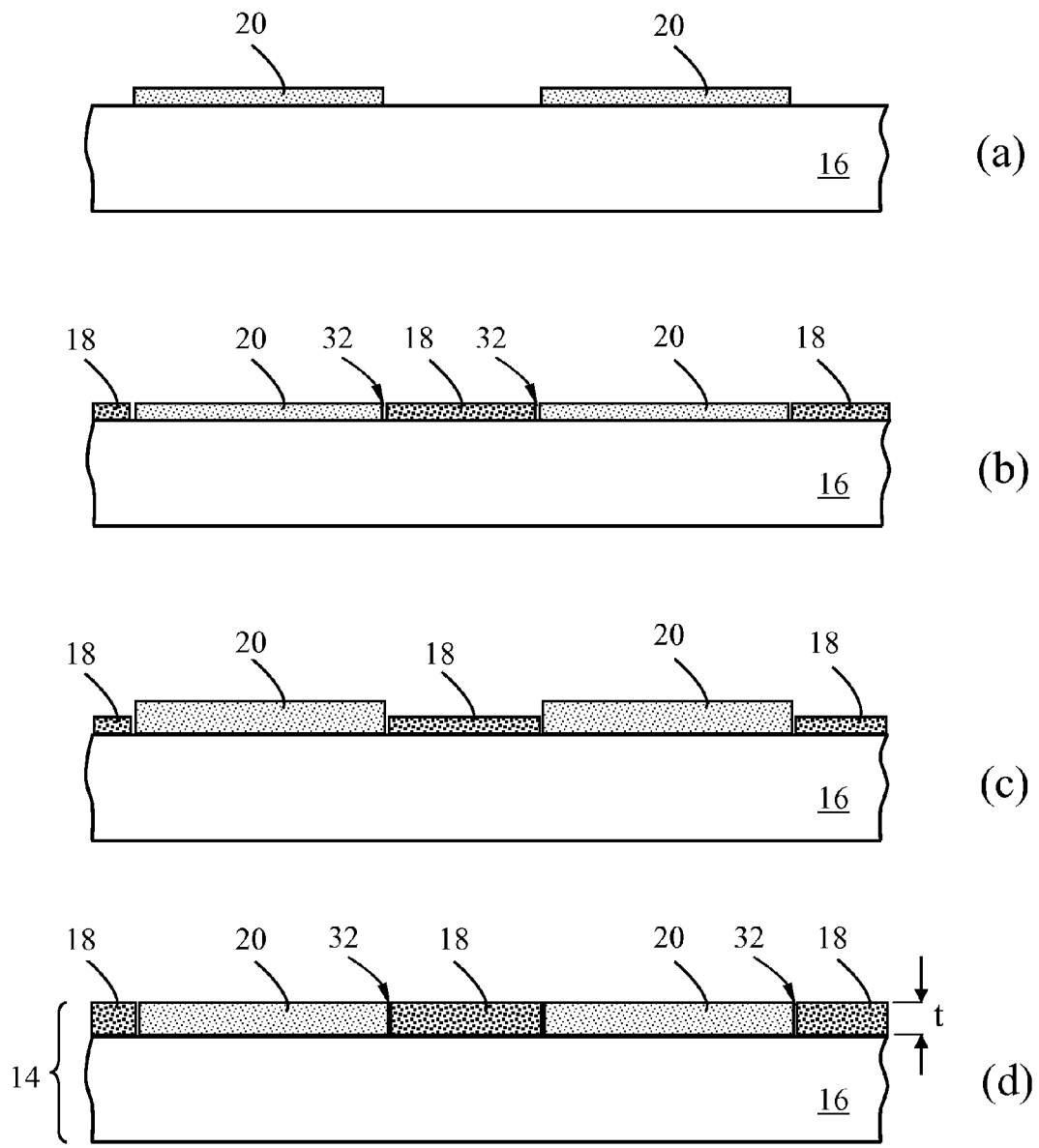
FIGS. 5(a) to 5(d) are schematic representations illustrating a method of fabricating a photoluminescence wavelength conversion component.

The phosphor materials 18, 20, which are in powder form, are thoroughly mixed in known proportions with a light transmissive binder material 32 such as a polymer material (for example a thermally or U.V. curable silicone, acrylic or an epoxy material) such as Star Technology's U.V. curable acrylic adhesive UVA4103 or a clear ink such as for example Nazdar's® U.V. curable litho clear overprint PSLC-294. The phosphor/binder mixture is applied to the face of the window 16 as one or more layers of uniform thickness. In a preferred embodiment the mixture is applied to the light transmissive window by screen printing and the thickness t of the layer controlled by the screen mesh size and the number of printing passes. FIGS. 5(*a*) to 5(*d*) are schematic representations illustrating an example of a method of fabricating a wavelength conversion component. As shown in FIG. 5(*a*) the phosphor areas 20 are screen printed using a first screen. The screen is changed and the other phosphor areas 18 are then printed in between the phosphor areas 20 using a second screen (FIG. 5(*b*)). The first screen is then used to print a further layer of the phosphor areas 20 overlying the first (FIG. 5(*c*)). Finally the second screen is used to print a further layer of the phosphor areas 18 overlying the first (FIG. 5(*d*)). Depending on the required thickness t of the phosphor areas will determine the number of print passes.

As will be apparent to those skilled in the art the phosphor mixture can be applied using other printing methods such as inkjet, letterpress, gravure or flexograph printing as well as other deposition techniques.

The phosphor material can comprise an inorganic or organic phosphor such as for example silicate-based phosphor of a general composition $A_3Si(O,D)_5$ or $A_2Si(O,D)_4$ in which Si is silicon, O is oxygen, A comprises strontium (Sr), barium (Ba), magnesium (Mg) or calcium (Ca) and D comprises chlorine (Cl), fluorine (F), nitrogen (N) or sulfur (S). Examples of silicate-based phosphors are disclosed in U.S. Pat. No. 7,575,697 "Europium activated silicate-based green phosphor" (assigned to Internatix Corp.), U.S. Pat. No. 7,601,276 "Two phase silicate-based yellow phosphor" (assigned to Internatix Corp.), U.S. Pat. No. 7,601,276 "Silicate-based orange phosphor" (assigned to Internatix Corp.) and U.S. Pat. No. 7,311,858 "Silicate-based yellow-green phosphor" (assigned to Internatix Corp.). The phosphor can also comprise an aluminate-based material such as is taught in our co-pending patent application US2006/0158090 "Aluminate-based green phosphor" and U.S. Pat. No. 7,390,437 "Aluminate-based blue phosphor" (assigned to Internatix Corp.), an aluminum-silicate phosphor as taught in co-pending application US2008/0111472 "Aluminum-silicate orange-red phosphor" or a nitride-based red phosphor material such as is taught in our co-pending U.S. patent application Ser. No. 12/632,550 filed Dec. 7, 2009. It will be appreciated that the phosphor material is not limited to the examples described herein and can comprise any phosphor material including nitride and/or sulfate phosphor materials, oxy-nitrides and oxy-sulfate phosphors or garnet materials (YAG).

The phosphor material comprises particles with a particle size 10 μm to 20 μm and typically of order 15 μm. The phosphor material can comprise particles of a size 2 μm to 60 μm depending on the deposition technique used to pattern them.

Figure 6:
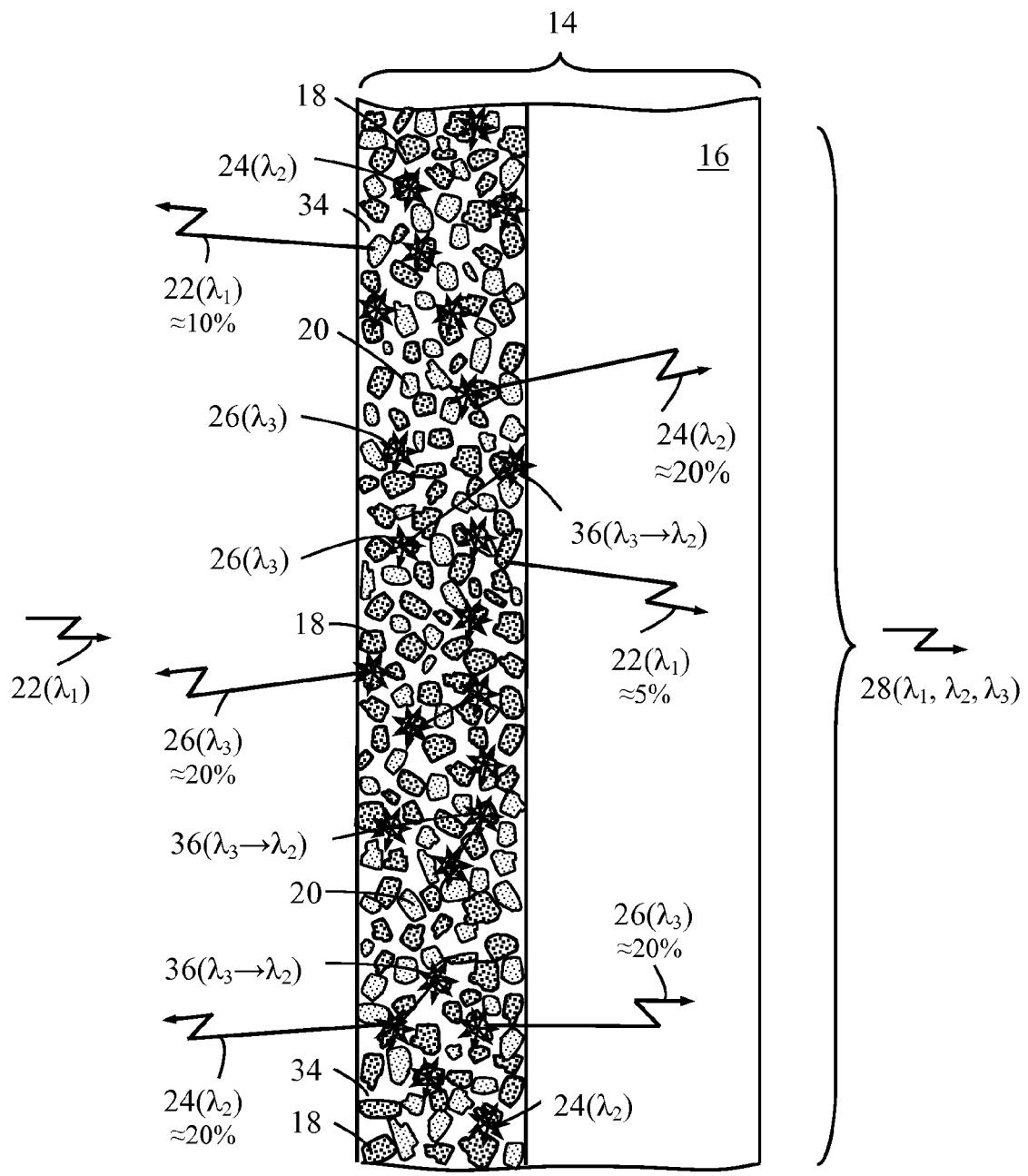
FIG. 6 is a schematic illustrating the principle of operation of a known light emitting device.

Before describing operation of the device of the invention, operation of a known light emitting device will be described with reference to FIG. 6 which shows a schematic of a LED-based light emitting device in which the wavelength conversion component 14 includes a mixture of the two phosphor material 18, 20 in a single layer. In operation blue light 22 of wavelength $\lambda_1$ from the LED 12 is transmitted by the light transmissive binder 32 until it strikes a particle of phosphor material. It is believed that on average as little as 1 in 1000 interactions of a photon with a phosphor material particle results in absorption and generation of photoluminescence light. The majority, of order 99.9%, of interactions of photons with a phosphor particle result in scattering of the photon. Due to the isotropic nature of the scattering process on average half of the scattered photons will be in a direction back towards the LED. Tests indicate that typically about 10% of the total incident blue light is scattered and emitted from the wavelength conversion component in a direction back towards the LED. For a white light emitting device the amount of phosphor material is typically selected to allow approximately 5% of the total incident blue light to be emitted from the window and contribute to the emission product. The device is configured such that the majority, approximately 85%, of the incident light is 22 absorbed by the phosphor material and re-emitted as photoluminescence light 24, 26. Due to the isotropic nature of photoluminescence, approximately half of the light 24, 26 generated by the phosphor material will be emitted in a direction towards the LED. As a result up to about 40% of the total light can be emitted as light 24, 26 of wavelengths $\lambda_2$, $\lambda_3$ and contributes to the emission product 28 whilst up to about 40% of the total light will be emitted as light 24, 26 of wavelength $\lambda_2$, $\lambda_3$ in a direction back towards the LED. Typically light that is emitted towards the LED is re-directed by a light reflective chamber (not shown) to increase the overall efficiency of the device.

The inventors have appreciated that as well as photoluminescence light generated by the phosphor materials 18, 20 absorbing the higher energy (shorter wavelength) light 22 from the LED (that is the conversion of blue light 22 ($\lambda_1$) to yellow light 26 ($\lambda_3$) and red light 24 ($\lambda_2$)), the longer wavelength ($\lambda_2$) emitting phosphor material 18 can also be excited by absorbing the higher energy (shorter wavelength) light ($\lambda_3$) generated by the other phosphor material 20. This inter-phosphor absorption results in a proportion 34 of the yellow light 26 being converted to red light 24 ($\lambda_3 \rightarrow \lambda_2$). Since the photoluminescence process always results in an energy loss (Stokes loss) this additional wavelength conversion results in an energy loss and a reduction in quantum efficiency.

Operation of a light emitting device 10 in accordance with the invention is now described with reference to FIG. 7 which is a schematic illustrating operation of the device of FIG. 1. The operation of the device of the invention is similar to that of FIG. 6 but due to the physical separation of the two phosphor materials 18, 20 into respective areas this virtually eliminate inter-phosphor absorption between immediately adjacent phosphor material areas. However as described earlier, approximately half of the phosphor generated light 24, 26 will be emitted from the phosphor wavelength conversion component 14 in a direction towards the LED 12 and then re-directed back towards the wavelength conversion component 14 by the light reflective chamber 30. On average approximately half (the actual proportion is related to the area ratio $A_1:A_2$ of the phosphor areas) of the higher energy (shorter wavelength) phosphor generated light 24 will, after being reflected by the light reflective chamber 30, be incident on phosphor material areas containing phosphor material 20 of the longer wavelength (lower energy) and this can give rise to inter-phosphor absorption. It will be appreciated however that by patterning the phosphor materials into respective areas this has still reduced the likelihood of inter-phosphor absorption by approximately half compared with the known device of FIG. 6.

Figure 8:
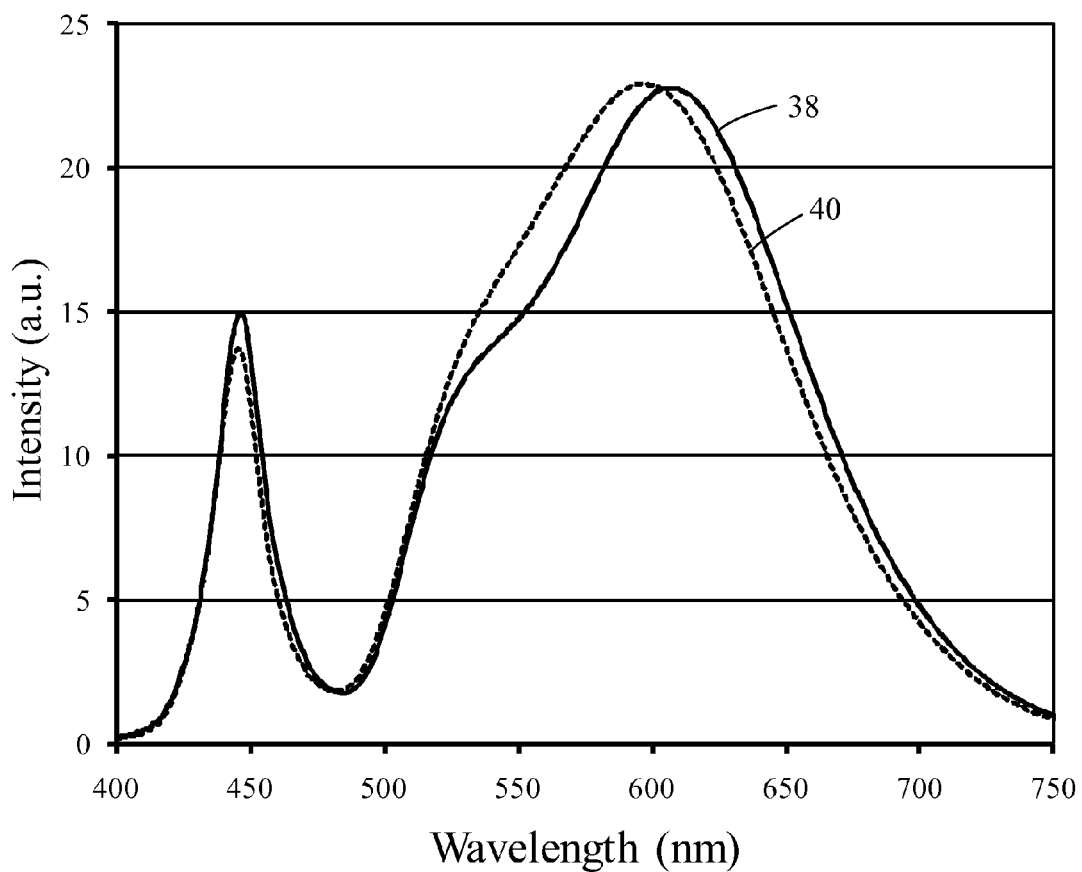
FIG. 8 is a plot of relative intensity versus wavelength for (a) a light emitting device in accordance with the invention and (b) the known light emitting device of FIG. 6.

FIG. 8 shows measured emission spectra (intensity versus wavelength) 38, 40 for (a) a light emitting device in accordance with the invention with a pattern of phosphor materials and (b) a light emitting device with a mixture of the same phosphor materials. Both devices are designed to generate warm white light (CCT≈3000K) with a target color C.I.E. (0.437, 0.404). The wavelength conversion component comprises a 2.5 inch diameter polycarbonate disc (20 mil Lexan® 8010) with the phosphor materials provided on one face. For the device of the invention the phosphor materials comprise a pattern of alternating strips (FIG. 2) of dimensions $w_1$=43.5 mil (1.11 mm), $w_2$=55.5 mil (1.42 mm) and $w_3$=0.5 mil (0.01 mm) corresponding to a 78.5% weight proportion of yellow phosphor material to a 21.5% weight proportion of red phosphor material. In comparison in the device comprising a mixture of the phosphor material, the phosphor material are mixed in weight proportions 87.8% yellow phosphor material to 12.2% red phosphor material and the phosphor material mixture screen printed on the polycarbonate disc.

As can be seen from the spectra in FIG. 8 patterning the phosphor materials in accordance with the invention generates substantially the same color emission product with a lower proportion (78.5% instead of 87.5%) of yellow phosphor material. This is consistent with the belief that by separating the phosphor materials this reduces the proportion of yellow light that is absorbed by the red phosphor material. The inventors have further discovered that for a given color emission product patterning the phosphor materials in accordance with the invention can increase the CRI (Color Rendering Index)—TABLE 1. Moreover devices and wavelength conversion components in accordance with the invention show a higher luminous efficacy.

TABLE 1

|  | Luminous efficacy | CRI |
|---|---|---|
| (a) Pattern of phosphor materials | 74.23% | 80.6 |
| (b) Mixture of phosphor materials | 74.03% | 74.6 |

Locating the phosphor material remote to the LED provides a number of benefits namely reduced thermal degradation of the phosphor material. Additionally compared with devices in which the phosphor material is provided in direct contact with the light emitting surface of the LED die, providing the phosphor material remotely reduces absorption of backscattered light by the LED die. Furthermore locating the phosphor remotely enables generation of light of a more consistent color and/or CCT since the phosphor material is provided over a much greater area as compared to applying the phosphor directly to the light emitting surface of the LED die with its areas that is typically at least an order of magnitude smaller.

Figure 9:
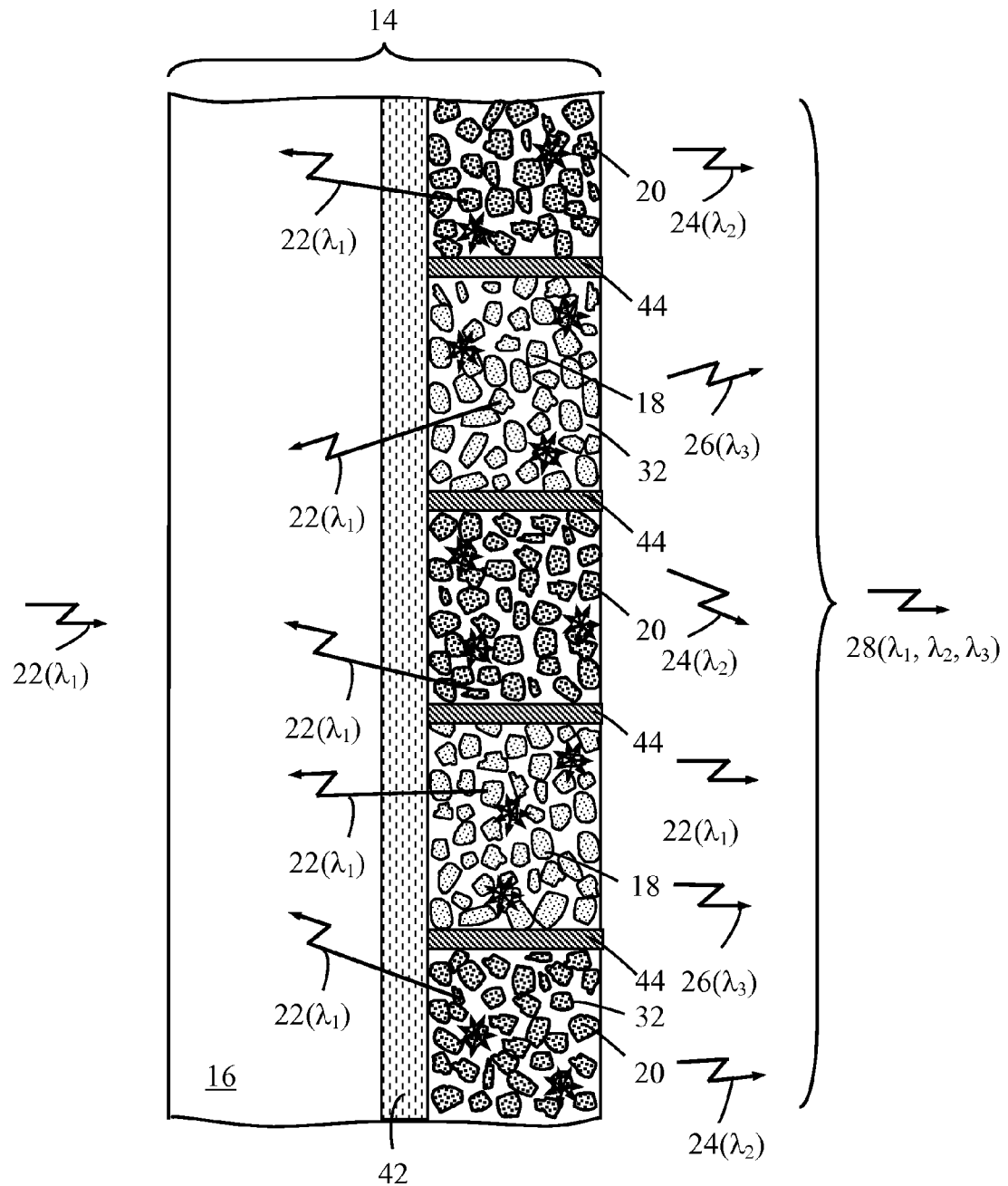
FIG. 9 is a schematic of a photoluminescence wavelength conversion component in accordance with yet another embodiment of the invention for use in the light emitting device of FIG. 1.

As shown in FIG. 9, it is envisioned in further light transmissive wavelength conversion components to include a wavelength selective reflective filter 42 interposed between the light transmissive substrate 16 and layer of phosphor materials 18, 20. The reflective filter 42 can comprise a multilayered filter structure such as for example a dichroic mirror or a mirror grating that is configured to have a reflection waveband that reflects light including light of at least wavelengths $\lambda_2$, $\lambda_3$ generated by the phosphor materials 18, 20 whilst allowing the transmission of light of wavelength $\lambda_1$ generated by the LED 12. To eliminate inter-phosphor absorption between immediately adjacent phosphor material areas, the gaps 30 between phosphor regions can be filled with a light reflective or light blocking material 44. In operation the reflective filter 42 prevents the emission of phosphor converted light 24, 26 from the wavelength conversion component in a direction towards the LED thereby virtually eliminating inter-phosphor absorption since phosphor converted light will be reflected back into the phosphor material area that generated the light to begin with. Moreover it will be appreciated that the light reflective or light blocking regions 44 between phosphor material areas can eliminate inter-phosphor absorption occurring in regions of the phosphor material areas that are immediately adjacent with a neighboring phosphor material area. In one example the material 44 can comprise a screen printable ink, for example a light reflective ink, which can be printed as a part of the printing process of the phosphor material areas. Alternatively it can comprise a light reflective metal that can be used to define recesses for receiving a respective phosphor material.

Figure 10:
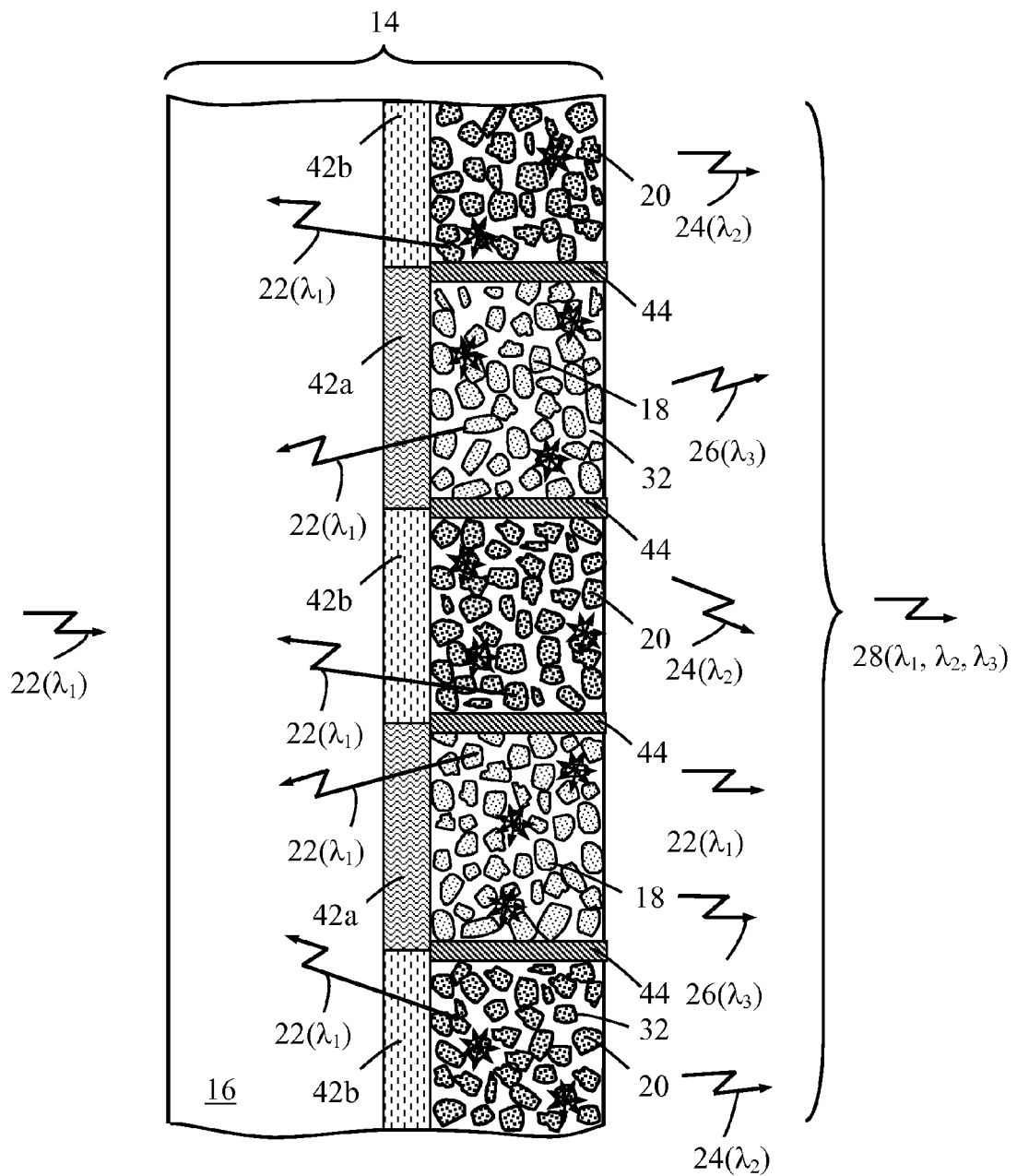
FIG. 10 is a schematic of a photoluminescence wavelength conversion component in accordance with yet a further embodiment of the invention for use in the light emitting device of FIG. 1

FIG. 10 shows a further light transmissive wavelength conversion component 14 in which each phosphor material area 18, 20 overlays a respective wavelength selective reflective filter area 42a, 42b. In this embodiment the light reflective filters areas 42a are configured to have a reflection waveband that reflects light of at least wavelength $\lambda_2$ generated by the phosphor material 18 whilst allowing the transmission of light of wavelength $\lambda_1$ generated by the LED 12. Conversely the light reflective filters areas 42b are configured to have a reflection characteristic that reflects light at least wavelength $\lambda_3$ generated by the phosphor material 20 whilst allowing the transmission of light of wavelength $\lambda_1$ generated by the LED 12. A benefit of providing a respective reflective filter 42a, 42b for each phosphor material areas is that each filter can have a narrower reflection waveband making them easier to fabricate.

Figure 11:
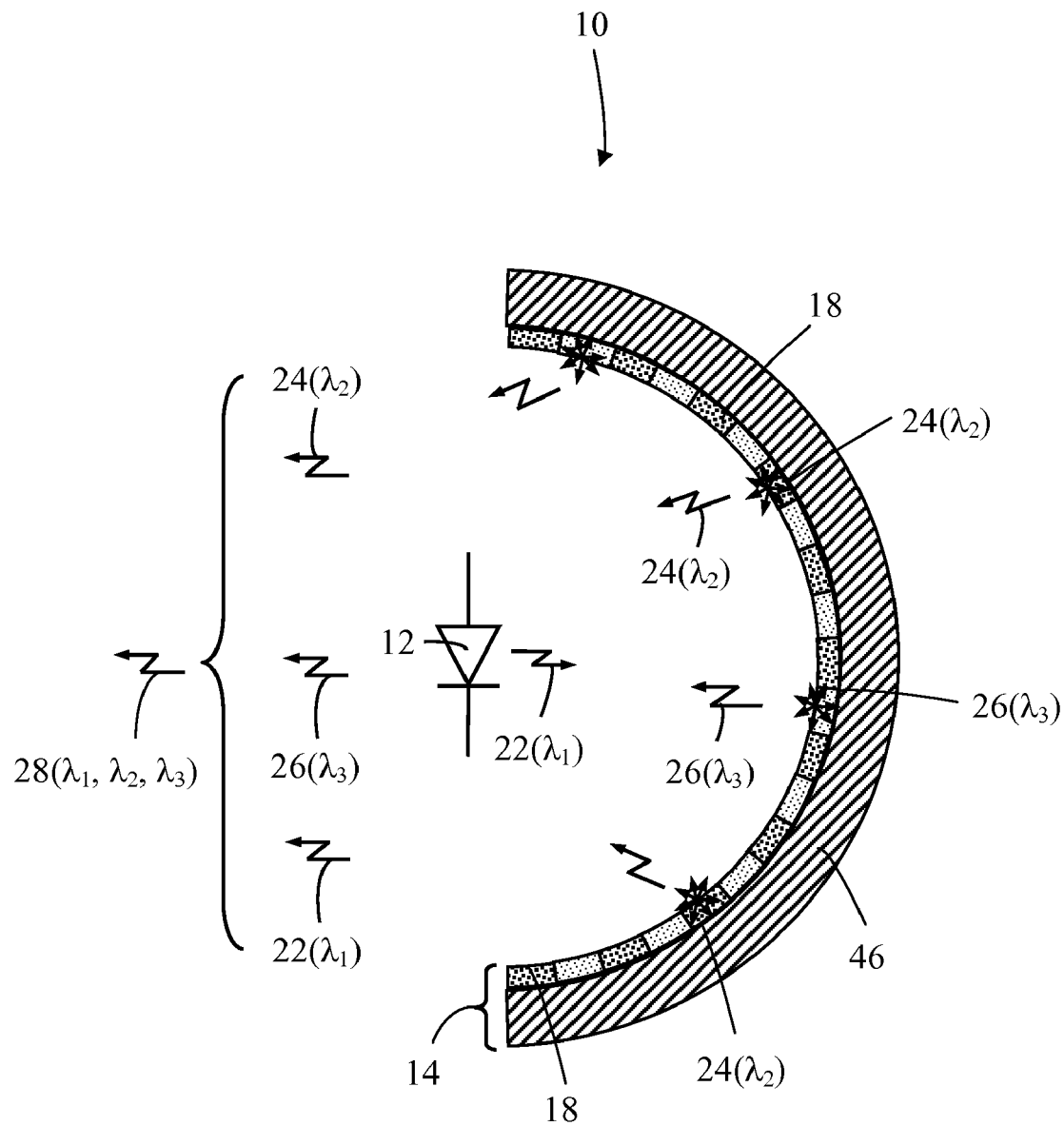
FIG. 11 is a schematic representation of an LED-based light emitting device in accordance with a further embodiment of the invention.

FIG. 11 shows a schematic representation of an LED-based white light emitting device 10 in accordance with a further embodiment of the invention. In this embodiment the wavelength conversion component 14 is light reflective and comprises a light reflective surface 46 on which the pattern of phosphor materials 18, 20 is applied. As shown the light reflective surface 46 can comprise a paraboloidal surface though it can comprise any surface including planar, convex and concave surfaces. To maximize light emission from the device, the light reflective surface is as reflective as possible and preferably has a reflectance of at least 0.9. The light reflective surface can comprise a polished metallic surface such as silver, aluminum, chromium; a light reflective polymer, a light reflective paper or a light reflective paint. To assist in the dissipation of heat the light reflective surface is preferably thermally conductive.

Figure 7:
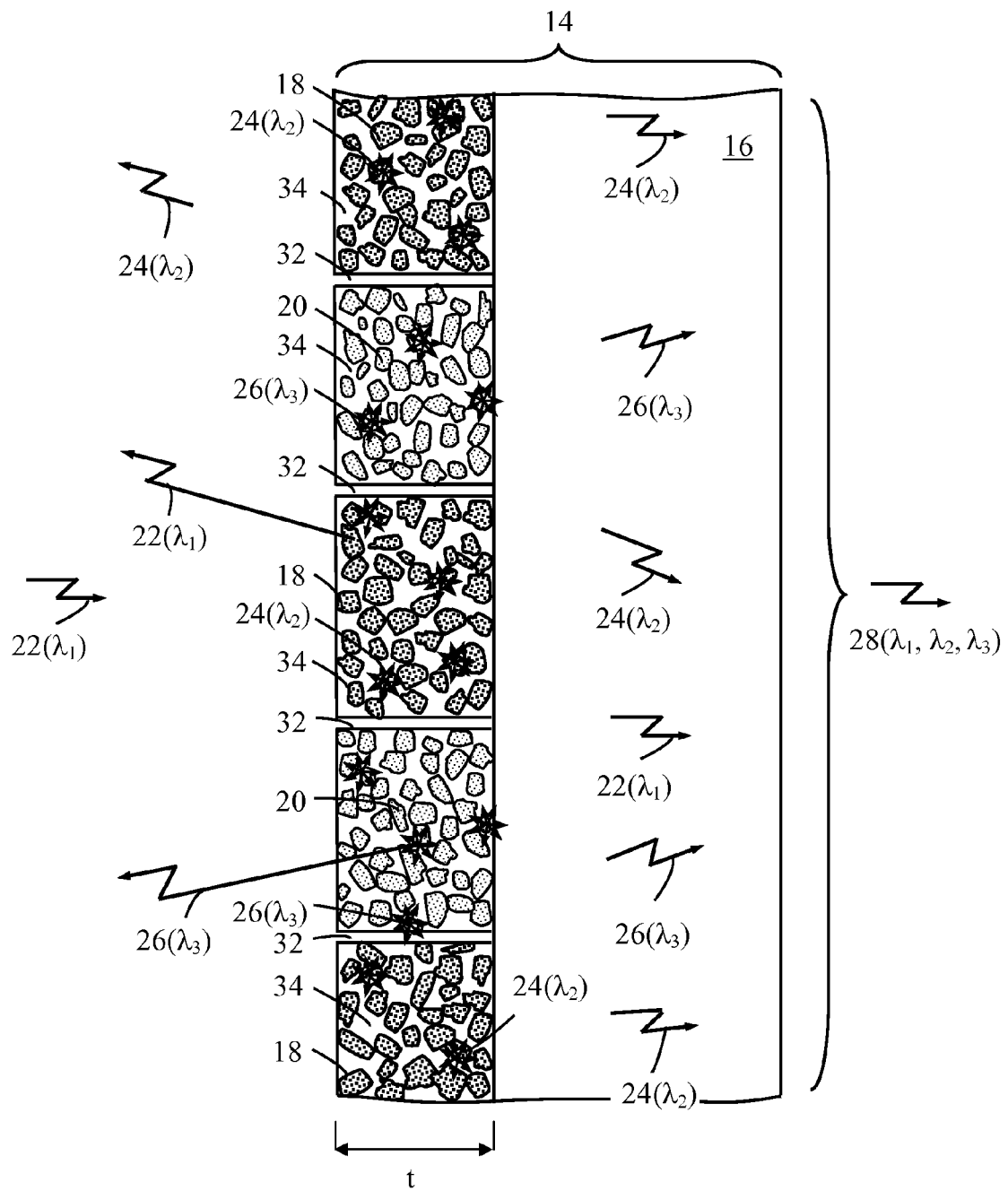
FIG. 7 is a schematic illustrating the principle of operation of the light emitting device of FIG. 1.
Figure 12:
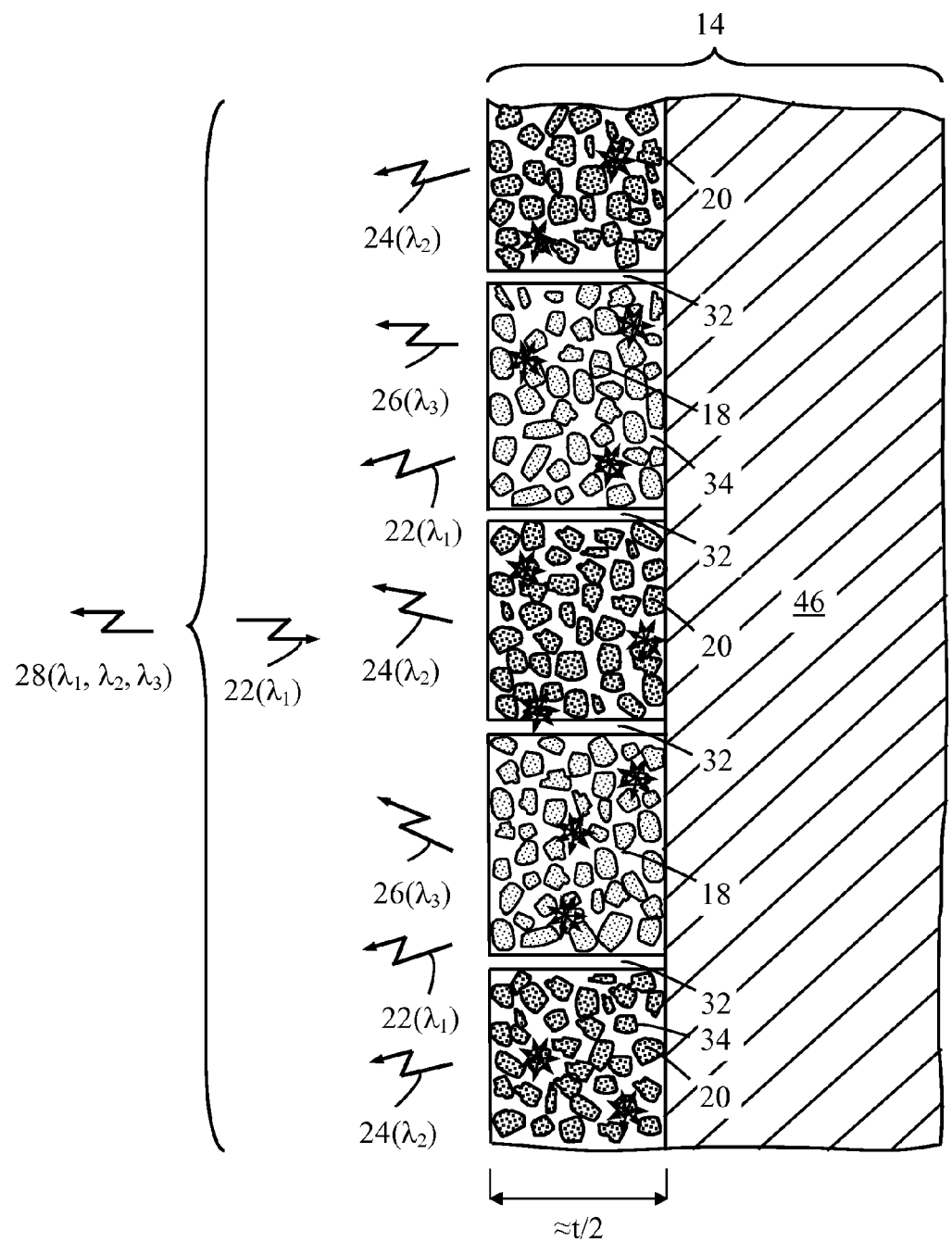
FIG. 12 is a schematic illustrating the principle of operation of the light emitting device of FIG. 11.

Operation of the light emitting device of FIG. 11 is illustrated in FIG. 12 and is not described in detail as it is similar to that of FIG. 7. However it is to be appreciated that since on average up to half of LED light will travel through the phosphor conversion layer twice, the thickness of the phosphor conversion layer 18, 20 can be of up to half, i.e. t/2, compared to arrangements with a light transmissive wavelength conversion component (FIG. 1). As a result of providing the phosphor material on a light reflective surface the same color of emission product can be achieved with a potential reduction of up to 50% in phosphor material usage.

Figure 13:
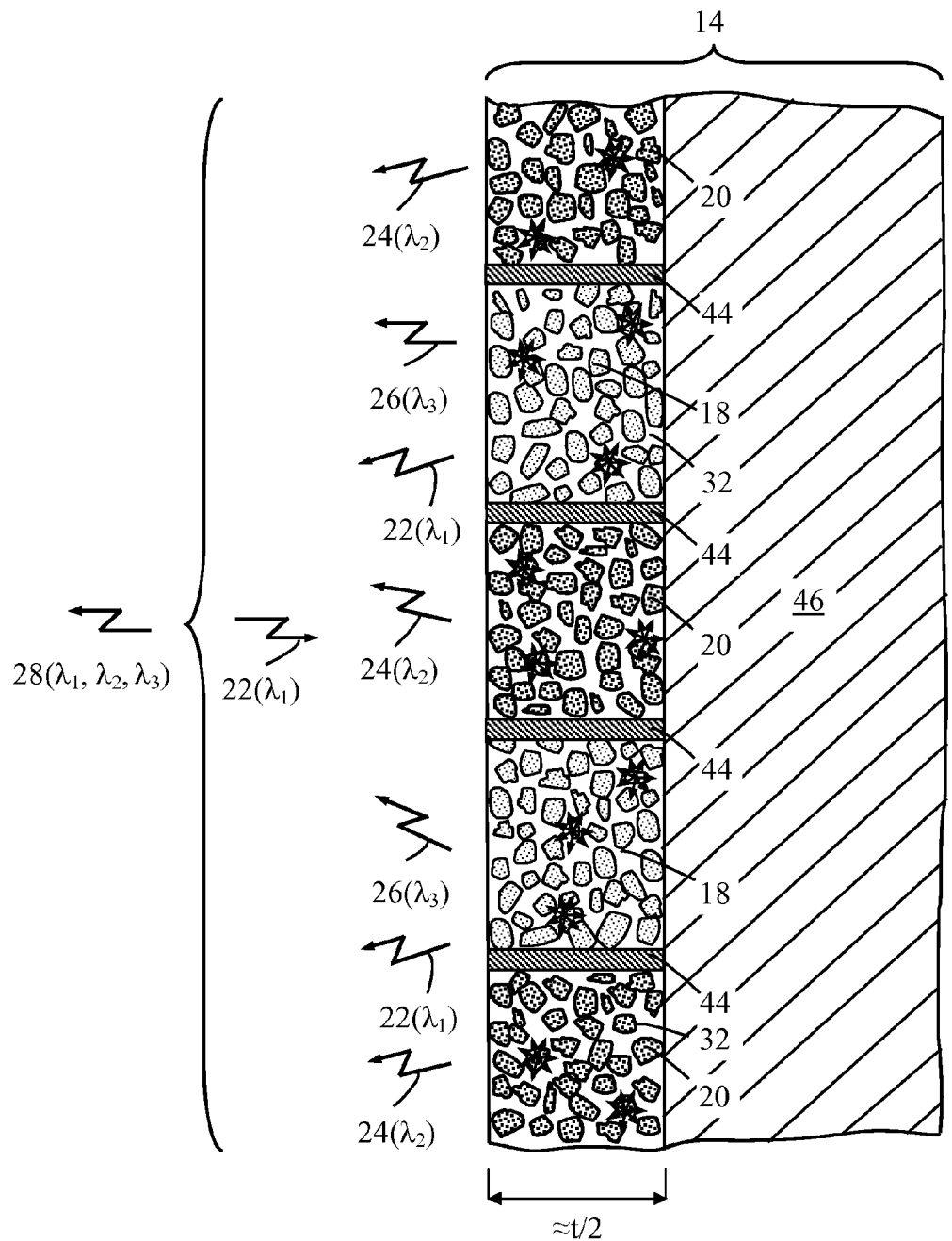
FIG. 13 is a schematic of a photoluminescence wavelength conversion component in accordance with another embodiment of the invention for use in the light emitting device of FIG. 11.

FIG. 13 is a schematic of a further light reflective wavelength conversion component in accordance with the invention. To eliminate inter-phosphor absorption between immediately adjacent phosphor material areas, the gaps 30 between phosphor regions are filled with a light transmissive or light blocking material 44.

It will be appreciated that light emitting devices in accordance with the invention are not limited to the exemplary embodiments described and that variations can be made within the scope of the invention. For example whilst the invention has been described in relation to LED-based light emitting devices the invention also applies to devices based on other solid-state light emitters including solid-state lasers and laser diodes.

What is claimed is:

1. A light emitting device comprising:
   at least one light emitter operable to generate blue light; and
   a wavelength conversion component comprising at least two phosphor materials, wherein the phosphor materials are operable to absorb at least a portion of said blue light and emit light of different colors, and wherein the emission product of the device comprises the combined light generated by the at least one light emitter and the phosphor materials, and wherein the phosphor materials are provided as a pattern of substantially non-overlapping areas on a surface of the component; and wherein the wavelength conversion component is located at a distance of at least 5 mm from the at least one light emitter.

2. The light emitting device of claim 1, wherein the total area of overlap of phosphor material areas is less than 0.1%.

3. The light emitting device of claim 2, wherein the region separating phosphor areas is less than an about 0.5 mm.

4. The light emitting device of claim 1, wherein phosphor material areas are separated by a region not containing any phosphor material.

5. The light emitting device of claim 4, wherein the regions separating phosphor areas are selected from the group consisting of being: light transmissive, light blocking and light reflective.

6. The light emitting device of claim 1, wherein the phosphor material areas have a dimension that is less that about 5 mm.

7. The light emitting device of claim 1, wherein neighboring phosphor material areas are configured to abut each other.

8. The light emitting device of claim 1, wherein the wavelength conversion component comprises a light transmissive substrate on which the pattern of phosphor material areas is provided as at least one layer.

9. The light emitting device of claim 8, and further comprising a wavelength selective reflective filter that is configured to be reflective to at least wavelengths of light generated by the phosphor materials and is substantially transmissive to light generated by the at least one light emitter.

10. The light emitting device of claim 9, wherein the wavelength selective reflective filter comprises a respective reflective filter associated with each phosphor material, wherein the reflective filter associated with a first phosphor material is configured to be reflective to at least wavelengths of light generated by the first phosphor material and is substantially transmissive to light generated by the at least one light emitter and wherein the reflective filter associated with the second phosphor material is configured to be reflective to at least wavelengths of light generated by the second phosphor material and is substantially transmissive to light generated by the at least one light emitter.

11. The light emitting device of claim 9, wherein the reflective filter is located between the light transmissive substrate and phosphor material areas.

12. The light emitting device of claim 8, wherein the pattern of phosphor material areas is provided on the substrate using a method selected from the group consisting of: screen printing, inkjet printing, letterpress printing, gravure printing and flexograph printing.

13. The light emitting device of claim 8 wherein the light transmissive substrate is selected from the group consisting of: an acrylic, a polycarbonate, an epoxy, a silicone and a glass.

14. The light emitting device of claim 1, wherein the wavelength conversion component comprises a light reflective surface on which the pattern of phosphor material areas is provided as at least one layer.

15. The light emitting device of claim 14, wherein the pattern of phosphor material areas is provided on the light reflective surface using a method selected from the group consisting of: screen printing, inkjet printing, letterpress printing, gravure printing and flexograph printing.

16. The light emitting device of claim 15, wherein light reflective surface has a reflectance of at least 0.9.

17. The light emitting device of claim 15, wherein the light reflective surface is selected from the group consisting of: silver, aluminum, chromium, a light reflective polymer, a light reflective paper, a light reflective paint and a light reflective metal.

18. The light emitting device of claim 1, wherein the at least one light emitter comprises an LED that is operable to generate blue light having a peak wavelength in a wavelength range 380 nm to 480 nm.

19. A wavelength conversion component for a converting the wavelength of light generated by a light emitter comprising on a surface thereof at least two phosphor materials configured as a pattern of substantially non-overlapping areas, and wherein the wavelength conversion component is located at a distance of at least 5 mm from the light emitter.

20. The wavelength conversion component of claim 19, wherein the total area of overlap of phosphor material areas is less than 0.1%.

21. The wavelength conversion component of claim 19, wherein neighboring phosphor material areas are separated by a region not containing any phosphor material.

22. The wavelength conversion component of claim 21, wherein the regions separating neighboring phosphor areas are selected from the group consisting of being: light transmissive, light blocking and light reflective.

23. The wavelength conversion component of claim 21, wherein the region separating neighboring phosphor areas is less than an about 0.5 mm.

24. The wavelength conversion component of claim 19, wherein the phosphor material areas have a dimension that is less that about 5 mm.

25. The wavelength conversion component of claim 19, wherein neighboring phosphor material areas are configured to abut each other.

26. The wavelength conversion component of claim 19, and comprising a light transmissive substrate on which the pattern of phosphor material areas is provided as at least one layer.

27. The wavelength conversion component of claim 26, and further comprising a wavelength selective reflective filter that is configured to be reflective to at least wavelengths of light generated by the phosphor materials and is substantially transmissive to light generated by the at least one light emitter.

28. The wavelength conversion component of claim 27, wherein the wavelength selective reflective filter comprises a respective reflective filter associated with each phosphor material, wherein the reflective filter associated with a first phosphor material is configured to be reflective to at least wavelengths of light generated by the first phosphor material and is substantially transmissive to light generated by the at least one light emitter and wherein the reflective filter associated with the second phosphor material is configured to be at least reflective to wavelengths of light generated by the second phosphor material and is substantially transmissive to light generated by the at least one light emitter.

29. The wavelength conversion component of claim 27, wherein the wavelength selective reflective filter is located between the light transmissive substrate and phosphor material areas.

30. The wavelength conversion component of claim 26, wherein the pattern of phosphor material areas is provided on the substrate using a method selected from the group consisting of: screen printing, inkjet printing, letterpress printing, gravure printing and flexograph printing.

31. The wavelength conversion component of claim 26, wherein the light transmissive substrate is selected from the group consisting of: an acrylic, a polycarbonate, an epoxy, a silicone and a glass.

32. The wavelength conversion component of claim 19, and comprising a light reflective surface on which the pattern of phosphor material areas is provided as at least one layer.

33. The wavelength conversion component of claim 32, wherein the pattern of phosphor material areas is provided on the light reflective surface using a method selected from the group consisting of: screen printing, inkjet printing, letterpress printing, gravure printing and flexograph printing.

34. The wavelength conversion component of claim 32, wherein light reflective surface has a reflectance of at least 0.9.

35. The wavelength conversion component of claim 32, wherein the light reflective surface is selected from the group consisting of: silver, aluminum, chromium, a light reflective polymer, a light reflective paper, a light reflective paint and a light reflective metal.

* * * * *